United States Patent
Zanelato et al.

(10) Patent No.: US 10,302,344 B2
(45) Date of Patent: May 28, 2019

(54) SYSTEM AND METHOD FOR FEEDING AND CONTROLLING A VARIABLE CAPACITY COMPRESSOR, A VARIABLE CAPACITY COMPRESSOR AND A COOLER COMPRISING A VARIABLE CAPACITY COMPRESSOR

(71) Applicant: Whirlpool S.A., Sao Paulo (BR)

(72) Inventors: Marcelo Zanelato, Joinville (BR); Cristiano Candido Valerio, Joinville (BR)

(73) Assignee: Embraco Indústria de Compressores e Soluções em Refrigeração Ltda (BR)

( * ) Notice: Subject to any disclaimer, the term of this patent is extended or adjusted under 35 U.S.C. 154(b) by 33 days.

(21) Appl. No.: 15/401,490

(22) Filed: Jan. 9, 2017

(65) Prior Publication Data
US 2018/0112901 A1    Apr. 26, 2018

(30) Foreign Application Priority Data
Oct. 24, 2016   (BR) .............................. 102016024765

(51) Int. Cl.
*F04B 49/00*   (2006.01)
*F04B 49/06*   (2006.01)
(Continued)

(52) U.S. Cl.
CPC ............ *F25B 49/022* (2013.01); *F04B 49/00* (2013.01); *F04B 49/06* (2013.01); *F04C 28/00* (2013.01);
(Continued)

(58) Field of Classification Search
CPC .... F04B 49/06; F04C 28/00; F25B 2600/021; F25B 2600/0253; F25B 49/022; F25B 49/025
(Continued)

(56) References Cited

U.S. PATENT DOCUMENTS

| 4,734,628 A | * | 3/1988 | Bench | ................... F04B 49/065 318/599 |
| 4,899,549 A | * | 2/1990 | Berge | ...................... F25B 27/00 236/75 |

(Continued)

FOREIGN PATENT DOCUMENTS

JP         2000333365 A   * 11/2000

*Primary Examiner* — Henry T Crenshaw
(74) *Attorney, Agent, or Firm* — Fay Sharpe LLP (57) ABSTRACT

A variable capacity compressor (100), a cooler (200) including same, and a method and system for controlling a variable capacity compressor are disclosed. An electronic control (50), a thermostat (30) and a power source (10) are disclosed, the power source including a neutral terminal and a phase terminal, the thermostat including a first terminal and a second terminal, and the electronic control including a phase feed input and a neutral feed input, the neutral terminal of the power source electrically connected to the neutral feed input of the electronic control and the phase terminal of the power source electrically connected to the first terminal of the thermostat, the second terminal of the thermostat connected electrically to the phase feed input of the electronic control, the thermostat configured to feed and un-feed selectively the electronic control, the electronic control activating and deactivating selectively the compressor and controlling its cooling capacity according to signals from an operation state sensor (40).

17 Claims, 4 Drawing Sheets

(51) Int. Cl.
  *F04C 28/00* (2006.01)
  *F25B 49/02* (2006.01)
  *H02M 1/00* (2006.01)

(52) U.S. Cl.
  CPC ...... *F25B 49/025* (2013.01); *F25B 2600/021* (2013.01); *F25B 2600/0253* (2013.01); *F25D 2700/12* (2013.01); *H02M 2001/0032* (2013.01); *Y02B 30/741* (2013.01)

(58) Field of Classification Search
  USPC .................................................. 62/228.1
  See application file for complete search history.

(56) References Cited

U.S. PATENT DOCUMENTS

| | | | | |
|---|---|---|---|---|
| 5,711,159 | A * | 1/1998 | Whipple, III | F25D 17/065 62/186 |
| 2003/0044289 | A1* | 3/2003 | Matsuda | F04B 27/1804 417/213 |
| 2005/0115259 | A1* | 6/2005 | Ergarac | F25D 29/00 62/228.1 |
| 2005/0279840 | A1* | 12/2005 | Schwendinger | G05D 23/1904 236/1 C |
| 2008/0264080 | A1* | 10/2008 | Creed | F25B 49/025 62/132 |
| 2012/0271463 | A1* | 10/2012 | Maass | F25B 49/025 700/276 |
| 2014/0105757 | A1* | 4/2014 | Maass | F04C 28/00 417/44.1 |
| 2015/0214863 | A1* | 7/2015 | Sumi | F04B 35/04 318/454 |

* cited by examiner

SYSTEM AND METHOD FOR FEEDING AND CONTROLLING A VARIABLE CAPACITY COMPRESSOR, A VARIABLE CAPACITY COMPRESSOR AND A COOLER COMPRISING A VARIABLE CAPACITY COMPRESSOR

CROSS REFERENCE TO RELATED APPLICATION

This application claims priority under 35 USC 119 to Brazilian Patent Application No. BR102016024765-9 filed Oct. 24, 2016, and the entire disclosure of said Brazilian application is hereby incorporated by reference in its entirety into the present specification.

FIELD OF INVENTION

The present invention relates to a system and a method for feeding and controlling a variable capacity compressor (VCC), wherein a simple thermostat of the electromechanical type or any other type, having the function of monitoring temperature and switching to actuate the compressor (for example, an electronic thermostat with relay output) is used for reducing stand-by consumption of the electronic control and for reducing costs with components and cables used in connecting the thermostat to the electronic control.

BACKGROUND OF INVENTION

It is known that commercial and domestic cooling systems, usually employed in the past and still marketed at present, make use of ON-OFF-type conventional compressors. Such compressors have, as a characteristic, the fact of being basically turned on and off at fixed rotation, according to the variation in temperature inside an environment to be cooled.

In order for a compressor to be turned on and off, when necessary, devices called thermostats are used. Thermostats have the function of measuring the variation in operation temperature in the environment to be cooled, and selectively turning on the compressor, if the temperature of the cooled environment exceeds a pre-established upper limit and turning off the compressor, and turning off the compressor if the cooling temperature reaches a pre-established lower limit.

The most widely used thermostat type is the one that makes use of a combination of a bulb containing a fluid that expands with rising temperature, installed so as to be exposed to the temperature inside the environment to be cooled, and mechanically linked to an electromechanical switch that is sensitive to this expansion and contraction of the fluid existing inside the bulb, being capable of turning on and off the switch at predetermined temperatures, according to the application. This switch interrupts the current supplied to the compressor, controlling the operation thereof, keeping the internal environment of the cooling system within pre-established temperature limits.

This type of thermostat is still widely used today, since it has a relatively simple construction and functioning. However, it should be pointed out that these thermostats only make the measurement and switching to turn on and off the compressor according to temperature.

With the technological developments in cooling, conventional compressors of the ON-OFF type are now being exchanged for compressors with higher energetic and cooling efficiency, the so-called variable capacity compressors (VCC). These compressors have, as a characteristic, adjustments in the cooling capacity by varying the velocity of pumping cooling gas, that is, its mass flow, according to the need of the system and its demand for cooling.

The variation in mass flow takes place from a minimum value to a maximum one, such a range of values being proportional to the rotation of the electric motor that drives the variable capacity compressor. The variation in rotation is achieved on these compressors by means of an electronic control called frequency inverter, which adjusts the voltage and frequency applied to the electric motor.

In general, the frequency inverter is provided with a number of electronic circuits with different functions, as for instance a power circuit with incoming stage for filtering electromagnetic interference and a "rectifying-bridge" state for converting an alternating voltage from an external supply source to direct voltage, a control circuit (microcontroller or Digital Signal Processor—DSP), an auxiliary power source for generating internal voltages for other circuits or components of the inverter, a circuit formed by power semiconductors for actuating the electric motor employed on the compressor, among others.

With the development of these new compressors, the simple thermostats of the electromechanical type stopped being used, since they had the limitation of not enabling adjustment of velocity of a variable capacity compressor, the terms only having the function of turning on and off the compressor.

In order to overcome such deficiencies, different types of devices and/or electronic circuits were developed to measure the temperature in a cooled environment and use the data to vary the rotation and, as a result, the mass flow.

For example, the cooling systems use now electronic temperature sensors such as PTC (Positive Temperature Coefficient), which read the temperature inside the cooled environment, compares the value read with pre-defined references and generates a command signal to the electronic control, so that the latter can turn on or off the compressor or can vary the rotation thereof. Other circuits and microprocessors with functioning similar to that of a PTC were developed to overcome the above-cited problems.

Although the PTCs and other circuits or microprocessors are efficient in their functioning, one observes that they have a high cost for implementation as compared to the simple devices of the electromechanical thermostat type. Moreover, one observes that such devices are generally used on cooling systems that make us of variable capacity compressors.

In this regard, what one observes is that such devices do not enable an upgrade in the conventional cooling systems, that is, they do not enable ON-OFF-type conventional compressors to be replaced by variable capacity compressors.

Figure 1:
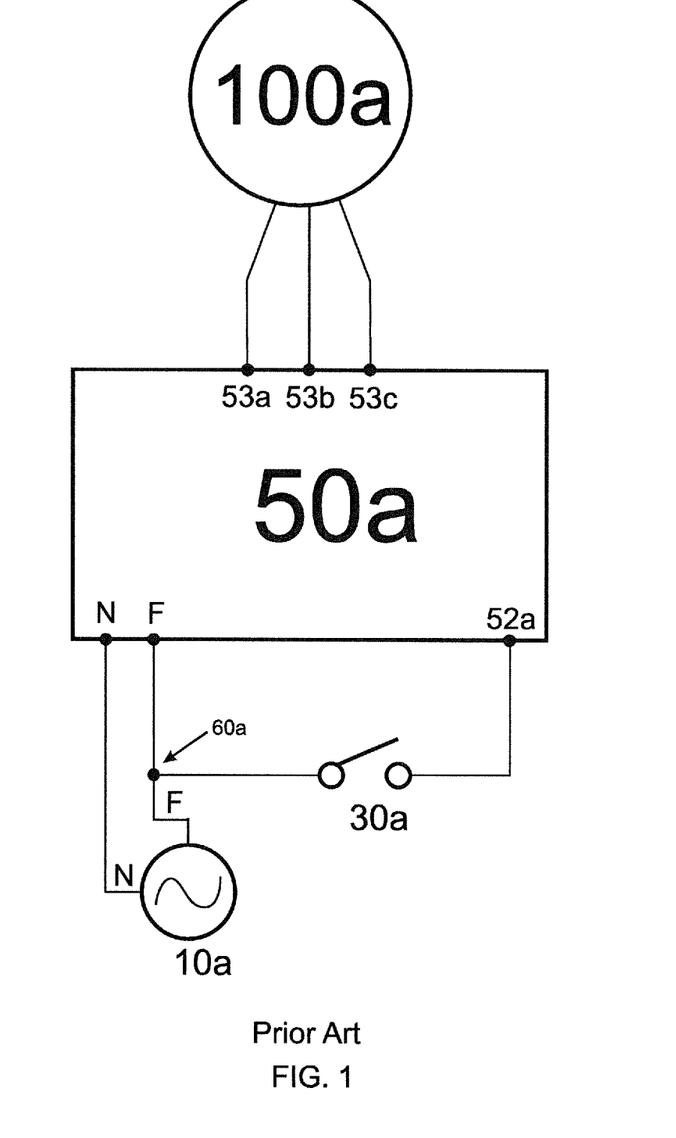
FIG. 1 illustrates a prior-art solution to use a simple thermostat of the electromechanical type in cooling systems that make use of variable capacity compressors.

With a view to reduce the costs with devices like PTCs, circuit or microprocessors, and with a view to enable upgrades of the conventional cooling systems, without much adaptation, a solution making use of the simple electromechanical thermostat (common on old coolers), or any other type of thermostat having the function of monitoring the temperature and the switching to actuate the compressor (for instance, an electronic thermostat with relay output), has been developed, as can be seen in FIG. 1.

FIG. 1 illustrates a cooling system comprising a variable capacity compressor 100a, an electronic control 50a having outputs 53a-c for connection to the compressor 100a, a power source 10a, and a simple electronic thermostat 30a.

One further observes that with this solution the electronic control 50a is a frequency inverter provided with neutral and feed-phase inputs, and a signal input 52a of the thermostat 30a, as will be described later.

In this solution, the power source 10a is linked directly to the feed inputs of the electronic control 50a and a tap 60a is made from the phase wire (connection between the phase of the power source 10a and the input of phase of the electronic control 50a). From this tap, a wire is led to the first terminal of the thermostat 30a and the second terminal of the thermostat 30a is linked to the signal input of the electronic control 50a, such input 52a being referenced internally to the neutral connection of the electronic control 50a.

The signal input 52a has the main function of checking whether the thermostat 30a is open or closed and to find out whether the compressor 100a should be turned on or off. Such input 52a is linked to an internal circuit comprising, for example, optocouplers, which also have the function of defining the rotation at which the compressor 100a should operate. The rotation is defined by means of data collected from the preceding cycles and stored in volatile memories.

A problem observed during the operation of the system of the solution of FIG. 1 is that, when the thermostat 30a is turned off, the electronic control 50a remains in stand-by, that is, it continues to be fed by the power source 10a and continues consuming energy only for the data of the volatile memory not to be lost. Thus, there is a clear waste of energy, which generates substantially high costs over time.

Moreover, although this solution seeks to reduce costs, what one observes is that the system still uses additional wires, components and cables/wires and so it still substantially reasonable costs if compared with the conventional systems, which used to operate in a simple way and without involving electronics. Another problem is that there are reasonable costs when one uses a volatile memory to store data from previous cycles.

Finally, considering that the electronic control needs to be altered to comprise other electronic components (memories, optocouplers) and wires, what one observes is that the costs in the mounting operation and in the contour conditions, such as test on the client's line, undergoes an impact, which may lead to drop in efficiency of production.

SUMMARY OF THE INVENTION

Thus, one does not observe, in the prior art, a system for feeding and controlling variable capacity compressors that makes use of simple thermostats of the electromechanical type, configured to feed and un-feed the electronic control, thereby preventing waste of electric energy.

Moreover, one does not observe, in the prior art, a simple system that does not make use of more complex circuits, capable of controlling the variable capacity compressor in real time, without there being a need to use data from preceding cycles.

A first objective of the present invention is to reduce stand-by consumption of the electronic control, without any need to keep the electronic control constantly fed.

A second objective of the present invention is to reduce the number and the costs with components, connectors and cables used to connect the electronic control to the thermostat electrically.

A third objective of the present invention is to enable coolers that make use of simple thermostats of the electromechanical type to have their ON-OFF-type conventional compressors directly exchanged by variable capacity compressors.

A fourth objective of the present invention is to carry out the control of the variable capacity compressors without there being any need for knowledge about the previous operation cycles of compressor.

A fifth objective of the present invention is to reduce costs with memories to store data from previous operation cycles of the compressor.

A sixth objective of the present invention is to simplify and reduce the costs in mounting operation and in contour conditions, such as test on the client's line.

The objectives of the present invention are achieved by means of a system for feeding and controlling a variable capacity compressor in a cooled environment, which comprises an electronic control, a thermostat arranged in the cooled environment, and a power source, the power source comprising a neutral terminal and a phase terminal, the thermostat comprising a first terminal and a second terminal, and the electronic control comprising a phase feed input and a neutral feed input, the neutral terminal of the power source being electrically connected to the neutral feed input of the electronic control, and the phase terminal of the power source being electrically connected to the first terminal of the thermostat, the second terminal of the thermostat being electrically connected to the phase feed input of the electronic control, the terminal being configured to feed and un-feed selectively the electronic control, the electronic control activating and deactivating selectively the compressor and controlling its cooling capacity.

The objectives of the present invention are also achieved by means of a method for feeding and controlling a variable capacity compressor in a cooled environment actuated electrically by an electronic control, the cooled environment comprising a thermostat configured to measure continuously an operation temperature in the cooled environment, the thermostat being actuated when the operation temperature in the cooled environment reaches a maximum limit of cooling temperature defined by the thermostat, the thermostat being deactivated when the operation temperature in the cooled environment reaches a minimum limit of cooling temperature defined by the thermostat;

the method comprising:

connecting electrically a phase feed input of the electronic control to the thermostat and connecting electrically a neutral feed input of the electronic control to a neutral terminal of a power source;

connecting electrically the thermostat to a phase terminal of the power source;

feeding the electronic control when the thermostat is actuated;

activating and controlling the cooling capacity of the compressor by means of the electronic control, if the thermostat is activated;

un-feeding the electronic control when the thermostat is deactivated; and deactivating the compressor, while the thermostat is deactivated.

Moreover, the objectives of the present invention are achieved by means of a variable capacity compressor in a cooled environment, activated electrically by means of an electronic control, the electronic control being electrically connected to a thermostat arranged in the cooled environment, the thermostat being configured to measure continuously an operation temperature in the cooled environment, the thermostat being activated when the operation temperature in the cooled environment reaches a maximum limit of cooling temperature defined by the thermostat, the thermostat being deactivated when the operation temperature in the cooled environment reaches a minimum limit of cooling temperature defined by the thermostat, a phase feed input of the electronic control being electrically connected to the thermostat and a neutral feed input of the electronic control being electrically connected to a neutral terminal of a power source, the thermostat being electrically connected to a phase terminal of the power source, the compressor being configured to be:

activated and have its cooling capacity controlled by the electronic control when the thermostat is activated, so that the electronic control is fed; and when the thermostat is deactivated, so that the electronic control is un-fed.

Finally, the objectives of the present invention are achieved by means of a cooler comprising a variable capacity compressor activated electrically by an electronic control, the cooler comprising a thermostat, the thermostat being configured to measure continuously an operation temperature in the cooler, the thermostat being activated when the operation temperature in the cooler reaches a maximum limit of cooling temperature defined by the thermostat, the thermostat being deactivated when the operation temperature in the cooler reaches a minimum limit of cooling temperature defined by the thermostat, the thermostat being electrically connected to the electronic control, the thermostat being electronically connected to a phase input of the electronic control and to a phase terminal of a power source, a neutral terminal of the power source being electrically connected to a neutral input of the electronic control, the cooler having its operation temperature altered, according to the activation and deactivation of the thermostat, the thermostat activating and deactivating selectively the compressor, so that:

when the thermostat is activated, the electronic control is fed, the electronic control activating and controlling the cooling capacity of the compressor, so that the operation temperature of the cooler can be reduced to the minimum limit of cooling temperature defined by the thermostat; and when the thermostat is deactivated, the electronic control is un-fed, the electronic control deactivating the compressor.

BRIEF DESCRIPTION OF THE DRAWINGS

The present invention will now be described in greater detail with reference to an example of embodiment represented in the drawings. The figures show.

DETAILED DESCRIPTION OF THE INVENTION

As pointed out before, FIG. 1 illustrates the prior art of a solution to make use of simple thermostat of the electromechanical type in cooling systems with variable capacity compressors. As pointed out before, in order to overcome the deficiencies and problems of this solution, the present invention has been developed.

Figure 2A:
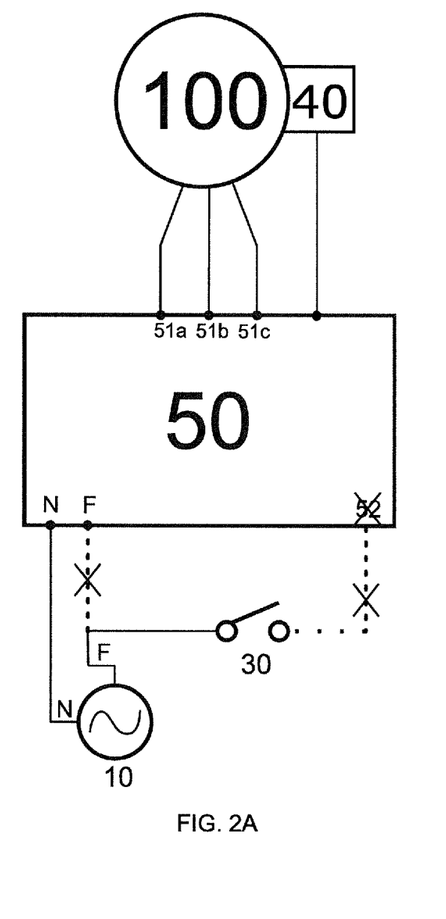
FIG. 2A illustrates the alterations in the connections and removals of circuits and wires for connecting the electronic control, the simple thermostat of the electromechanical type, the power source and the variable capacity compressor.

FIG. 2A illustrates the alterations in the connections and removals of circuits, and wires for connecting the electronic control 50, thermostat 30, power source 10 and variable capacity compressor 100. One observes that a wire of the thermostat 30 for the electronic control 50 is removed, the tap 60 of the phase wire of the power source 10 for phase input of the electronic control is removed and the internal circuit for receiving signals from the thermostat 52 is removed in the present invention.

Figure 2B:
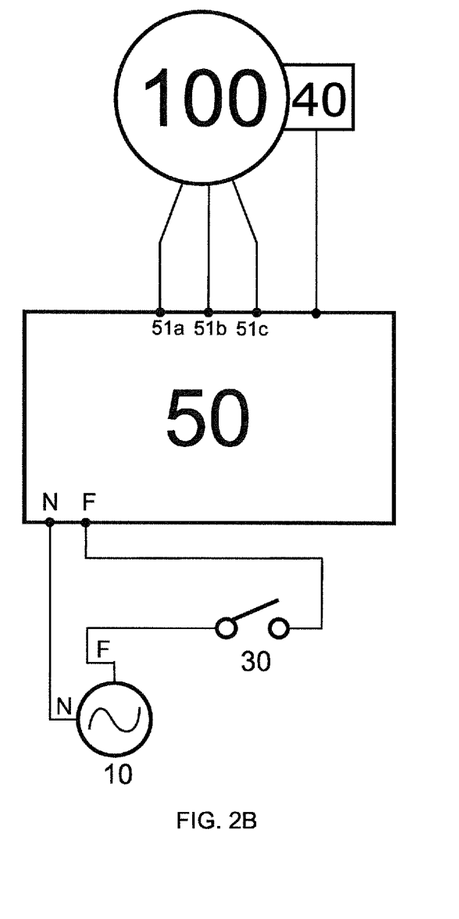
FIGS. 2B and 3 illustrates a preferred embodiment of the new connections between the electronic control, the simple thermostat of the electromechanical type, the power source and the variable capacity compressor, according to the teachings of the present invention.
Figure 3:
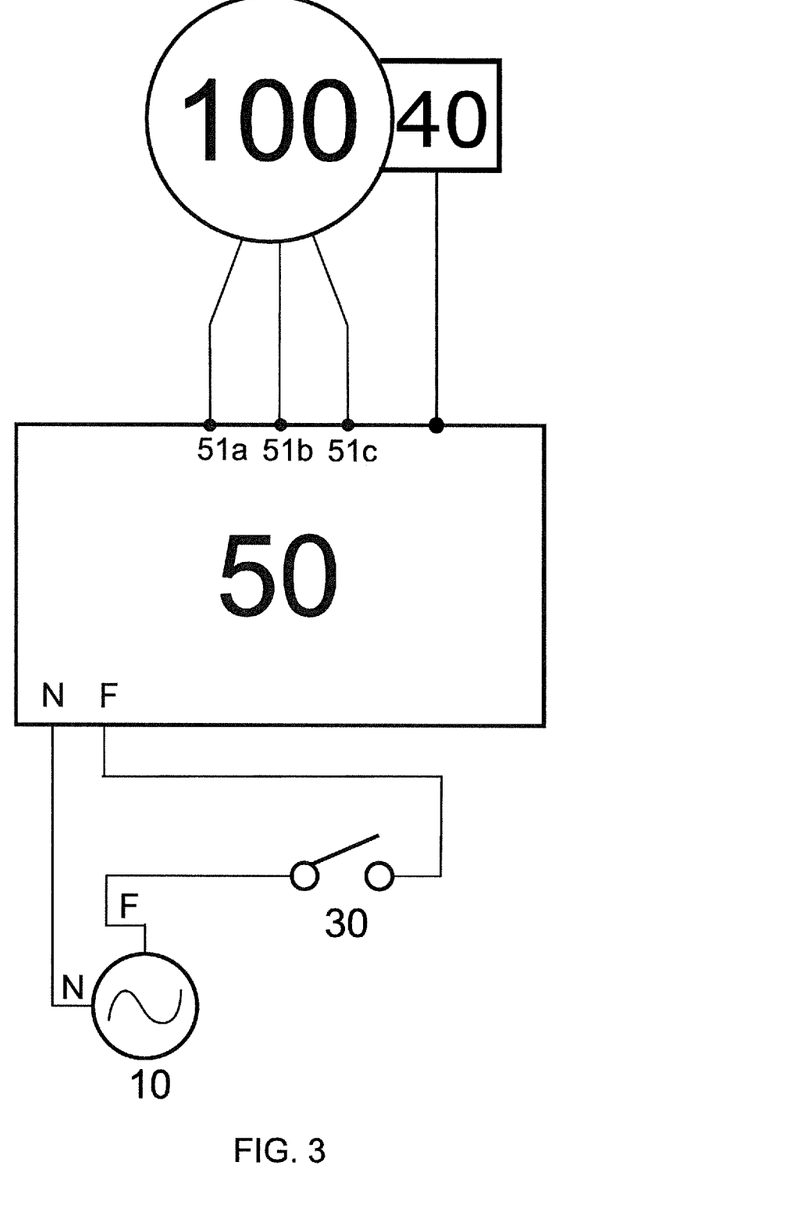

FIGS. 2B and 3 illustrate a preferred embodiment of the new connections between the electronic control 50, the thermostat 30, the power source 10 and the variable capacity compressor 100 of the present invention.

Figure 4:
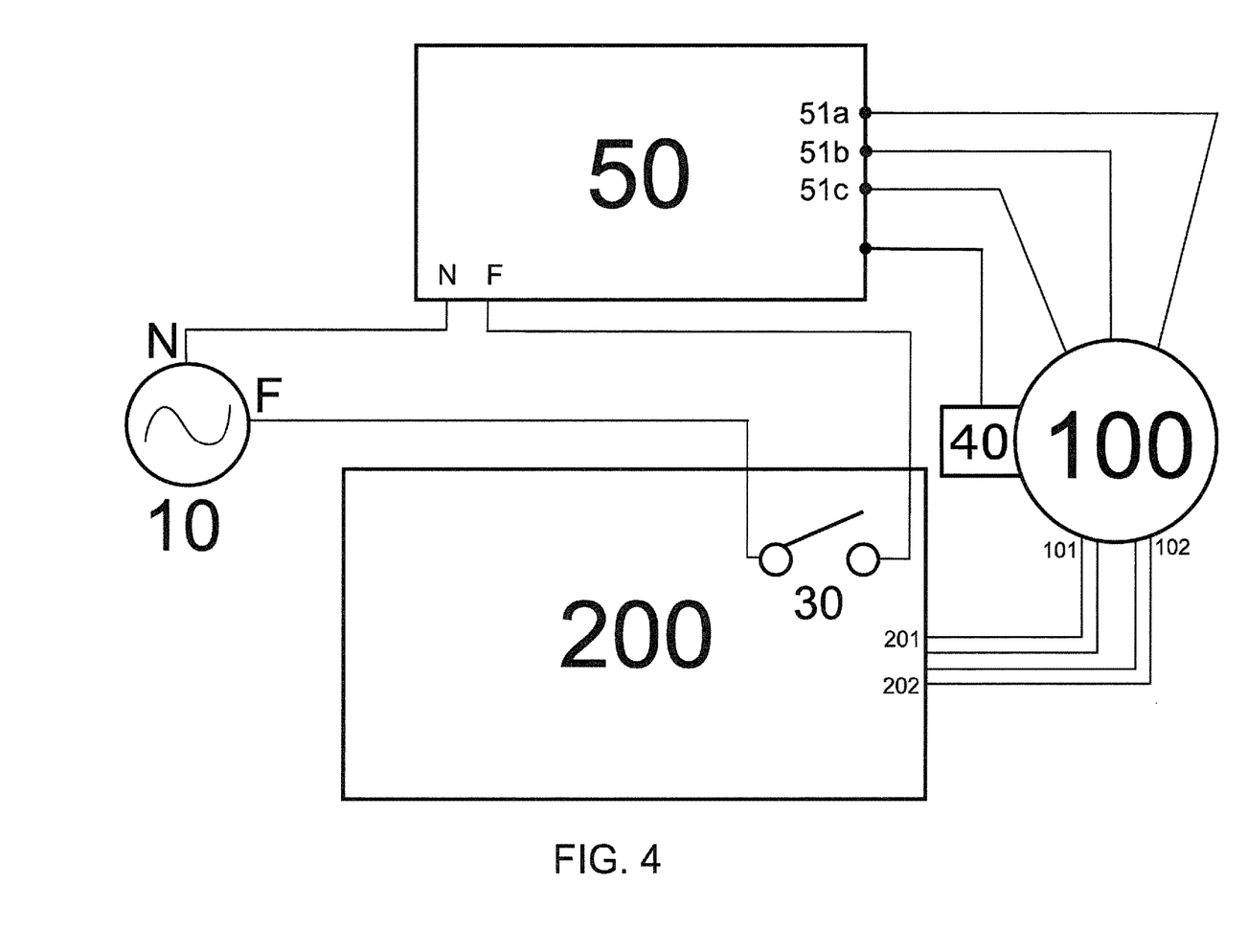
FIG. 4 illustrates a cooler comprising an electronic control, a simple thermostat of the electromechanical type, a power source and a variable capacity compressor connected in accordance to the teachings of the present invention.

One observes that FIG. 4 illustrates a system for feeding and controlling a variable capacity compressor 100 comprising an electronic control 50, a thermostat 30 and a power source 10, such a system being used for controlling the cooling in a cooled environment 200.

In a preferred embodiment, the cooled environment 200 may be a household refrigerator or a commercial one. Obviously, this is only a preferred embodiment, so that any cooled environment 200 that makes use of a system with a thermostat can be used with the present invention.

The variable capacity compressor 100 of the present invention has, as a characteristic, the capability of adjusting the cooling capacity by varying the velocity of pumping cooling gas, that is, its mass flow, according to the need of the system and its demand for cooling. The variation in the mass flow takes place from a minimum value to a maximum value, this range of values being proportional to the rotation of the electric motor that drives the variable capacity compressor. The variation in the rotation is achieved, on these compressors, by means of the electronic control 50.

In a preferred embodiment, the variable capacity compressor 100 is driven by electric motors of single-phase, two-phase or three-phase direct current, depending on the type of application. Moreover, the compressor 100 comprises at least three connections for receiving feed signals from the electronic control 50. It should be noted that the number of connections depends upon the type of electric motor used (single-phase, two-phase or three-phase). The compressor 100 further comprises intake valves 101 and 102, which are, respectively, fluidly connected to the evaporator 201 and to the condenser 202 of the cooled environment 200, preferably of the cooler.

With regard to the electronic control 50, preferably it is a frequency inverter provided with a number of electronic circuits with different functions, as for example, a power circuit with input stage for filtering electromagnetic interference and a "rectifying-bridge" stage for converting alternating voltage from an external power source to a direct voltage, a control circuit (microcontroller or DSP—Digital Signal Processor), an auxiliary power source for generating the internal voltages for other circuits or components of the inverter, a circuit formed by power semiconductors for activating the electric motor employed on the compressor, among others.

The electronic control 50 is used for controlling the voltage and the frequency applied to the compressor 100, thus varying the velocity of pumping cooling gas, that is, the mass flow thereof, according to the need of the system and its demand for cooling.

In a preferred embodiment of the present invention, the electronic control 500 comprises a phase feed input, a neutral feed input and at least three connections 51a-c for sending feed signals to the compressor 100. It should be observed that the number of connections depends on the type of electric motor used (single-phase, two-phase or three-phase).

The thermostat 30 of the present invention is simple, of the electromechanical type that makes use of a combination of a bulb containing a fluid that expands with the rise in temperature, installed so as to be exposed to the temperature inside the cooled environment, and mechanically connected to an electromechanical switch, sensitive to this expansion and contraction of the fluid present inside the bulb, being capable of turning on and off the switch at predetermined temperatures, according to the application. This switch interrupts the current supplied to the compressor, controlling its operation, keeping the internal environment of the cooling system within pre-established limits of temperature.

It should be pointed out that other types of thermostat or devices might be used instead of the electromechanical type, as long as they have only the function of monitoring the temperature and switching to activate the compressor 100. For instance, electronic thermostats with relay output might be used instead of the electromechanical thermostat. In other words, thermostats or devices with the function of controlling the compressor 100 having the same function of the inverter are not part of the scope of the present invention.

In a preferred embodiment of the present invention, the thermostat 30 comprises a first terminal, a second terminal and a bulb configured to measure an operation temperature $T_{oper}$ in the cooled environment 200. Further preferably, one observes that the thermostat 30 is arranged inside the cooled environment 200, especially inside the cooler.

The power source 10 is a source of alternating current of 127V or 220V, depending on the type of motor used for driving the variable capacity compressor 100. The power source 10 comprises a neutral terminal and a phase terminal.

The components of the system of the present invention having been described, the electric and fluid connections thereof are described hereinafter.

In the system of the present invention, the neutral terminal of the power source 10 is electrically connected to the neutral feed input of the electronic control 50 and the phase terminal of the power source 10 is electrically connected to the first terminal of the thermostat 30, the second terminal of the thermostat 30 is electrically connected to the phase feed input of the electronic control 50.

Considering that the thermostat 30 is arranged inside the cooling environment 200, one observes that the latter will measure continuously the operation temperature $T_{oper}$ in the cooled environment 200.

During the measuring process, the thermostat 30 can be activated and deactivated according to the variation in operation temperature $T_{oper}$ within the cooled environment 200. By "activating and deactivating" one means the action of the thermostat 30 to close or open its contact, according to the expansion and contraction of the bulb.

More specifically, the thermostat 30 is activated when the operation temperature $T_{oper}$ in the cooled environment 200 reaches a maximum cooling temperature $T_{max}$ defined by the thermostat 30 and deactivated when the operation temperature $T_{oper}$ in the cooled environment 200 reaches a minimum limit of cooling temperature $T_{min}$ defined by the thermostat 30.

In general, the user can define which temperature is suitable for the cooled environment 200, especially in a cooler. For instance, the thermostat 30 may have a turning button with steps, which the user can turn and select the desired temperature. Alternatively, the temperature may be selected by the user digitally on the thermostat 30.

Depending on the state of the thermostat 30, that is, whether it is or is not activated, the latter can selectively feed and un-feed the electronic control 50. With the feeding and un-feeding of the electronic control 50, the latter is capable of selectively activating the compressor 100 and controlling its cooling capacity or deactivate the compressor 100.

When the thermostat 30 is activated, the electronic control 50 is fed so as to activate the compressor 100 and control its cooling capacity. It should be noted that the cooling capacity of the compressor 100 continues to be controlled by the electronic controller 50, until the thermostat 30 is deactivated. In other words, the compressor 100 continues to be controlled by the electronic control 50, while the operation temperature $T_{oper}$ does not reach the minimum limit of cooling temperature $T_{min}$ defined by the thermostat 30.

In an opposite way, when the thermostat 30 is deactivated, the electronic control 50 is un-fed, so as to deactivate the compressor 100. When both the electronic control 50 and the compressor 100 are off, the system does not consume any energy, thus preventing unnecessary expenditure of energy with stand-by consumption, as happens in the prior-art systems. It should be pointed out that the compressor 100 is kept deactivated, while the operation temperature $T_{oper}$ in the cooled environment 200 does not reach the maximum limit of cooling temperature $T_{max}$.

The control of cooling and operation temperature $T_{oper}$ takes place in real time through the electronic control 50, without the need for additional circuits or memories, for collecting data from preceding circuits. Such a control takes place by activating the compressor 100 at an initial operation rotation by the electronic control 50. When the thermostat 30 is activated, the initial operation rotation produces an initial operation torque sufficient to overcome the inertia of the compressor 100.

In order for the control to be carried out, at least one operation state sensor 40 is used for measuring continuously the operation state of the compressor 100. Said at least one operation state sensor 40 is at least one sensor selected from a group consisting of: current sensor, torque sensor, power sensor, time sensor, rotation sensor, or the combination of any thereof.

The signals generated continuously by said at least one operation state sensor 40 are then continuously sent to the electronic control 50. The latter, in turn, carrying out a derivation of the signals and then calculates the cooling capacity of the compressor 100 and the power to be applied to the compressor 100 to reach such capacity.

It should be pointed out that the cooling capacity of the compressor 100 is calculated continuously from the signals from said at least one operation state sensor 40. On the basis of the cooling capacities of the compressor 100 calculated continuously, the electronic control 50 is configured to alter continuously the operation rotation of the compressor 100, applying a higher or lower power for controlling the compressor 100.

As pointed out before, the present invention brings a number of advantages over the prior art, like reduction in waste or energy by keeping the electronic control 50 constantly fed, reduction of costs with circuits, optocouplers, volatile memories, wires, reduction of costs with mounting operation and in contour conditions such as test on the client's line, increase in the production efficiency, among others.

A preferred example of embodiment having been described, one should understand that the scope of the present invention encompasses other possible variations, being limited only by the contents of the accompanying claims, which include the possible equivalents.

The invention claimed is:

1. A system for feeding and controlling a variable capacity compressor (100) in a cooled environment (200), said system comprising:
   an electronic control (50),
   a thermostat (30) arranged in the cooled environment (200),
   at least one operation state sensor (40), and
   a power source (10),
   the operation state sensor (40) being configured to measure continuously an operation state of the compressor (100),
   the power source comprising a neutral terminal and a phase terminal, the thermostat (30) comprising a first terminal and a second terminal, and the electronic control (50) comprising a phase feed input and a neutral feed input,
   wherein the neutral terminal of the power source (10) is electrically connected to the neutral feed input of the electronic control (50), and the phase terminal of the power source (10) is electrically connected to the first terminal of the thermostat (30), the second terminal of the thermostat (30) being electrically connected to the phase feed input of the electronic control (50),
   the thermostat (30) being configured to feed and un-feed selectively the electronic control (50),
   the electronic control (50) activating and deactivating selectively the compressor (100) and controlling its cooling capacity, the electronic control (50) being configured to calculate continuously the cooling capacity of the compressor (100), according to the signals of said at least one operation state sensor (40) and to alter continuously the operation rotation of the compressor (100) according to the cooling capacity calculated continuously.

2. The system according to claim 1, wherein the thermostat is of the electromechanical type.

3. The system according to claim 1, wherein that the thermostat is of the electronic type.

4. The system according to claim 1, wherein the thermostat (30) is configured to measure continuously the operation temperature ($T_{oper}$) in the cooled environment (200).

5. The system according to claim 4, wherein the thermostat (30) is activated when the operation temperature ($T_{oper}$) in the cooled environment (200) reaches a maximum limit ($T_{max}$) defined by the thermostat (30) and deactivated when the operation temperature ($T_{oper}$) in the cooled environment (200) reaches a minimum limit of cooling temperature ($T_{min}$) defined by the thermostat (30).

6. The system according to claim 5, wherein the electronic control (50) is selectively fed and un-fed by activating and deactivating the thermostat (30).

7. The system according to claim 6, wherein the electronic control (50) activates the compressor (100) and controls its cooling capacity, while the thermostat (30) is activated.

8. The system according to claim 7, wherein the cooling capacity of the compressor (100) continues to be controlled by the electronic control (50) until the thermostat (30) is deactivated.

9. The system according to claim 1, wherein the electronic control (50) comprises a frequency inverter.

10. The system according to claim 9, wherein the compressor (100) is activated at an initial operation rotation by the electronic control (50), when the thermostat (30) is activated.

11. The system according to claim 10, wherein the initial operation rotation produces an initial operation torque sufficient to overcome the inertia of the compressor (100).

12. The system according to claim 11, wherein said at least one operation state sensor (40) is selected from the group comprising: current sensor, torque sensor, power sensor, time sensor, rotation sensor, or a combination of any thereof.

13. A method of feeding and controlling a variable capacity compressor (100) in a cooled environment (200), said variable capacity compressor activated electrically by an electronic control (50), the cooling environment (200) comprising a thermostat (30) configured to measure continuously the operation temperature ($T_{oper}$) in the cooled environment (200), wherein said method comprises:
   activating the thermostat (30) when the operation temperature ($T_{oper}$) in the cooled environment (200) reaches a maximum of cooling temperature ($T_{max}$) defined by the thermostat (30);
   deactivating the thermostat (30) when the operation temperature ($T_{oper}$) in the cooled environment (200) reaches a minimum cooling temperature ($T_{min}$) defined by the thermostat (30);
   connecting electrically a phase feed input of the electronic control (50) to the thermostat (50) and connecting electrically a neutral feed input of the electronic control (50) to a neutral terminal of a power source (10);
   connecting electrically the thermostat (30) to a phase terminal of the power source (10);
   feeding the electronic control (50) when the thermostat (30) is activated;
   activating and controlling the cooling capacity of the compressor (100) by means of the electronic control (50) if the thermostat (30) is activated;
   un-feeding the electronic control (50) when the thermostat (30) is deactivated; and
   deactivating the compressor (100) when the thermostat (30) is deactivated;
   measuring continuously, by means of a torque sensor (40), the operation torque of the compressor (100);
   sending continuously signals from the torque sensor (40) to the electronic control (50);
   calculating continuously the cooling capacity of the compressor (100), according to the signals from the torque sensor (40);
   altering continuously the operation rotation of the compressor (100) according to the cooling capacity calculated continuously.

14. The method according to claim 13, wherein the compressor (100) is activated at an initial operation rotation by the electronic control (50) when the thermostat (30) is activated.

15. The method according to claim 14, wherein the initial operation rotation produces an initial operation torque sufficient to overcome the initial inertia of the compressor (100).

16. A variable capacity compressor (100) in a cooled environment (200), activated electrically by an electronic control (50), the electronic control (50) being connected electrically to a thermostat (30) arranged in the cooled environment (200) and to at least one operation state sensor (40), the thermostat (30) being configured to measure continuously an operation temperature ($T_{oper}$) in the cooled environment (200), the thermostat (30) being activated when the operation temperature ($T_{oper}$) in the cooled environment reaches a maximum limit of cooling temperature ($T_{max}$) defined by the thermostat (30), the thermostat (30) being deactivated when the operation temperature ($T_{oper}$) in the cooled environment (200) reaches a minimum limit of cooling temperature ($T_{min}$) defined by the thermostat (30), wherein a phase feed input of the electronic control (50) is electrically connected to the thermostat (30) and a neutral feed input of the electronic control (50) is electrically connected to a neutral terminal of a power source (10), the thermostat (30) being electrically connected to a phase terminal of the power source (10), the compressor (100) configured to be:

activated and have its cooling capacity controlled by the electronic control (50) when the thermostat (30) is activated so that the electronic control (50) is fed; and deactivated when the thermostat (30) is deactivated so that the electronic control (50) is un-fed, the operation state sensor (40) being configured to continuously measure the operation torque of the compressor (100), the electronic control (50) being configured to continuously receive signals from the operation state sensor (40), calculating continuously the cooling capacity of the compressor (100), according to the signals from the torque sensor (40) and altering continuously the operation rotation of the compressor (100) according to the cooling capacity calculated continuously.

17. A cooler (200) comprising a variable capacity compressor (100) activated electrically by an electronic control (50), the cooler (200) comprising a thermostat (30), the electronic control (50) being connected electrically to the thermostat (30) and to at least one operation state sensor (40), the thermostat (30) configured to measure continuously an operation temperature ($T_{oper}$) in the cooler (200), the thermostat (30) being activated when the operation temperature ($T_{oper}$) in the cooler (200) reaches a maximum limit of cooling temperature ($T_{max}$) defined by the thermostat (30), the thermostat (30) being deactivated when the operation temperature ($T_{oper}$) in the cooler (200) reaches a minimum limit of cooling temperature ($T_{min}$) defined by the thermostat (30), the thermostat (30) being electrically connected to the electronic control (50), wherein the thermostat (30) is electrically connected to a phase input of the electronic control (50) and to a phase terminal of a power source (10), a neutral terminal of the power source (10) being electrically connected to a neutral input of the electronic control (50), the cooler (20) having its operation temperature ($T_{oper}$) altered, according to the activation and deactivation of the thermostat (30), the thermostat (30) activating and deactivating selectively the compressor (100), such that:

when the thermostat (30) is activated, the electronic control (50) is fed, the electronic control (50) activating and controlling the cooling capacity of the compressor (100), so that the operation temperature ($T_{oper}$) of the cooler (200) will be reduced until the minimum limit of cooling temperature ($T_{min}$) defined by the thermostat (30); and when the thermostat (30) is deactivated, the electronic control (50) is deactivated, the electronic control (50) deactivating the compressor (100), the operation state sensor (40) being configured to continuously measure the operation torque of the compressor (100), the electronic control (50) being configured to continuously receive signals from the operation state sensor (40), calculating continuously the cooling capacity of the compressor (100), according to the signals from the torque sensor (40) and altering continuously the operation rotation of the compressor (100) according to the cooling capacity calculated continuously.

\* \* \* \* \*